United States Patent [19]

Yoshihara et al.

[11] Patent Number: 5,399,605
[45] Date of Patent: Mar. 21, 1995

[54] POLYESTER RESIN COMPOSITION COMPRISING BUTYLENE TEREPHTHALATE, ETHYLENE TEREPHTHALATE, AND A POLYALKYLENE GLYCOL DERIVATIVE

[75] Inventors: Nori Yoshihara; Yukio Gotoh, both of Otsu, Japan

[73] Assignee: Toyo Boseki Kabushiki Kaisha, Osaka, Japan

[21] Appl. No.: 89,613

[22] Filed: Jul. 12, 1993

Related U.S. Application Data

[63] Continuation of Ser. No. 894,616, Jun. 5, 1992, abandoned.

[30] Foreign Application Priority Data

Jun. 10, 1991 [JP] Japan .................. 3-166356

[51] Int. Cl.$^6$ .................. C08J 5/10; C08K 5/06; C08L 31/08
[52] U.S. Cl. .................. 524/377; 524/284; 524/287; 524/291; 524/292; 524/308; 524/310; 525/444; 356/68
[58] Field of Search ............. 524/284, 287, 291, 292, 524/308, 310, 377; 356/68; 525/444

[56] References Cited

U.S. PATENT DOCUMENTS

| | | | |
|---|---|---|---|
| 4,189,549 | 2/1980 | Matsunaga et al. | 525/444 |
| 4,215,032 | 7/1980 | Kobayashi et al. | 260/40 R |
| 4,352,904 | 10/1982 | Deyrup | 524/287 |
| 4,391,938 | 7/1983 | Memon et al. | 524/284 |
| 4,418,172 | 11/1983 | Kasuga et al. | 524/292 |
| 4,440,889 | 4/1984 | Hergenrother et al. | 524/292 |
| 4,795,771 | 1/1989 | Yoshihara | 524/308 |
| 4,840,984 | 6/1989 | Somemiya et al. | 525/444 |
| 4,960,812 | 10/1990 | Youn et al. | 524/291 |
| 5,115,047 | 5/1992 | Hashimoto et al. | 525/444 |

*Primary Examiner*—Paul R. Michl
*Assistant Examiner*—U. K. Rajguru
*Attorney, Agent, or Firm*—Foley & Lardner

[57] ABSTRACT

There is disclosed a polyester resin composition comprising: (a) 50 to 70 parts by weight of a polyester resin composed mainly of a repeating unit of butylene terephthalate; (b) 30 to 50 parts by weight of a polyester resin composed mainly of a repeating unit of ethylene terephthalate; (c) 0.1 to 10 parts by weight of a polyalkylene glycol derivative having at least one end group of carboxylate and alkyl ether, per 100 parts by the total weight of the polyester resins (a) and (b); and if necessary or required, (d) not more than 120 parts by weight of an inorganic reinforcing agent, per 100 parts by the total weight of the polyester resins (a) and (b).

7 Claims, No Drawings

POLYESTER RESIN COMPOSITION COMPRISING BUTYLENE TEREPHTHALATE, ETHYLENE TEREPHTHALATE, AND A POLYALKYLENE GLYCOL DERIVATIVE

This application is a continuation of U.S. application Ser. No. 07/894,616, filed Jun. 5, 1992, now abandoned.

FIELD OF THE INVENTION

The present invention relates to a molding polyester resin composition and more particularly to a molding polyester resin composition from which various molded articles with excellent dimensional stability and high surface glossiness can be obtained, even when molded at a mold temperature below 70° C.

BACKGROUND OF THE INVENTION

In recent years, various polyester resin compositions have been employed for the production of molded articles. However, conventional polyester resin compositions have the respective disadvantages depending upon the main component contained therein. For example, in the case of polyester resin compositions composed mainly of a polybutylene terephthalate resin, satisfactory molded articles with high surface glossiness cannot be obtained because of its too high crystallinity. Moreover, polyester resin compositions composed mainly of a polyethylene terephthalate resin exhibit a low rate of crystallization and require high mold temperatures above 120° C., although molded articles with high surface glossiness but low dimensional stability can only be obtained. As disclosed in Japanese Patent Publication No. 50-33832, these characteristics can be improved to a certain degree by use of a polymer blend comprising a polyethylene terephthalate resin and a polybutylene terephthalate resin at particular proportions; however, such a polymer blend is unsatisfactory for attaining the compatibility of surface glossiness and moldability. Furthermore, as disclosed in Japanese Patent Publication No. 59-0698, the above characteristics can also be improved in cases where a glycidyl ether of poly(alkylene glycol) is blended with a polyethylene terephthalate; however, such a polymer blend has the disadvantage of having unsatisfactory moldability and more particularly of requiring high mold temperatures.

OBJECTS OF THE INVENTION

In order to solve the above problems of the prior art, the present inventors have intensively studied various polyester resin compositions. As a result, they have found that an alloyed composition of two kinds of polyester resins and a specific accelerator for crystallization makes an improvement both in the flowability and crystallinity, which improvement is difficult to attain by the conventional polyester resin compositions. This makes it possible to obtain various molded articles with excellent dimensional stability during use and high surface glossiness, even when the composition is molded at a relatively low mold temperature below 70° C., thereby completing the present invention.

That is, the main object of the present invention is to provide a polyester resin composition which can be molded at a mold temperature of below 70° C. and can make an improvement in the surface glossiness and dimensional accuracy of the resulting molded articles.

This object as well as other objects and advantages of the present invention will become apparent to those skilled in the art from the following description.

SUMMARY OF THE INVENTION

According to the present invention, there is provided a polyester resin composition comprising: (a) 50 to 70 parts by weight of a polyester resin composed mainly of a repeating unit of butylene terephthalate; (b) 30 to 50 parts by weight of a polyester resin composed mainly of a repeating unit of ethylene terephthalate; and (c) 0.1 to 10 parts by weight of a polyalkylene glycol derivative having at least one end group of carboxylate and alkyl ether, per 100 parts by the total weight of the polyester resins (a) and (b). If necessary or required, the composition may further comprise (d) not more than 120 parts by weight of an inorganic reinforcing agent, per 100 parts by the total weight of the polyester resins (a) and (b).

DETAILED DESCRIPTION OF THE INVENTION

The polyester resin (a) composed mainly of a repeating unit of butylene terephthalate can be prepared from terephthalic acid and butylene glycol monomers, or ester-forming derivatives thereof. These monomers may be replaced with other copolymerizable monomers at a proportion of 20 mol% or less, preferably 10 mol% or less. Examples of the acid monomers are isophthalic acid, naphthalene-1,4- or -2,5-dicarboxylic acid, diphenylether-4,4'-dicarboxylic acid, adipic acid, sebacic acid and the like. Examples of the glycol monomers are propylene glycol, ethylene glycol, diethylene glycol, dipropylene glycol, neopentyl glycol, cyclohexanedimethanol, 2,2'-bis(4-hydroxyphenyl)propane, 2,2'-bis(4-hydroxy-2,8,5,6-tetrabromophenyl)propane and the like. As the copolymerizable monomer, oxyacids such as p-oxybenzoic acid and p-hydroxyethoxybenzoic acid can also be used. Moreover, a small amount of trifunctional monomers may be used for copolymerization, so long as they would not deteriorate the moldability of the resulting resin composition.

Preferably, the polyester resin (a) has an intrinsic viscosity of not less than 0.6, and more preferably not less than 0.65, as determined in a phenol/tetrachloroethane mixture (6/4 in weight ratio) at 30° C.

The polyester resin (b) composed mainly of a repeating unit of ethylene terephthalate can be obtained from a polyethylene terephthalate resin by addition of conventional acid and/or glycol copolymerizable monomers thereto. Examples of the acid monomers are isophthalic acid, naphthalene-1,4- or -2,5-dicarboxylic acid, diphenylether-4,4'-dicarboxylic acid, adipic acid, sebacic acid and the like. Examples of the glycol monomers are propylene glycol, butylene glycol, diethylene glycol, dipropylene glycol, neopentyl glycol, cyclohexanedimethanol, 2,2'-bis(4-hydroxyphenyl)propane, 2,2'-bis(4-hydroxy-2,8,5,6-tetrabromophenyl)propane and the like. As the copolymerizable monomer, oxyacids such as p-oxybenzoic acid and p-hydroxyethoxybenzoic acid can also be used. Moreover, a small amount of trifunctional monomers may be used for copolymerization, so long as they would not deteriorate the moldability of the resulting resin composition.

Preferably, the polyester resin (b) has an intrinsic viscosity of not less than 0.5, and more preferably not less than 0.55, as determined in a phenol/tetrachloroethane mixture (6/4 in weight ratio) at 30° C.

In the polyester resin composition of the present invention, the amount of the polyester resin (a) is 50 to 70 parts by weight, and preferably 50 to 64.5 parts by weight, whereas the amount of the polyester resin (b) is 30 to 50 parts by weight, and preferably 35.5 to 50 parts by weight. In particular, amounts more than 70 parts by weight of the polyester resin (a) are not preferred because the surface glossiness of the resulting molded articles is deteriorated. On the other hand, amounts less than 50 parts by weight of the polyester resin (a) are not preferred because the moldability of the resin composition becomes poor, so that the dimensional accuracy of the resulting molded articles is decreased.

Examples of the opolyalkylene glycol derivative (c) having at least one end group of carboxylate and alkyl ether are compounds of the following formulae (I) and (II):

$$R_1-[CO]_m-[R_2O]_n-\underset{\underset{O}{\|}}{C}-R_3 \quad (I)$$

$$R_4-[O]_p-[R_2O]_n-R_5 \quad (II)$$

wherein p and m are, independently, 0 or 1; n is an integer of from 2 to 30; $R_1$ and $R_3$ are, independently, a $C_1-C_{18}$ aliphatic or aromatic hydrocarbon group with the proviso that $R_1$ is hydrogen when m is 0; $R_2$ is a $C_2-C_6$ aliphatic hydrocarbon group; $R_4$ and $R_5$ are, independently, a $C_1-C_{18}$ aliphatic hydrocarbon group, with the proviso that $R_4$ is hydrogen when p is 0.

Preferred examples of the polyalkylene glycol derivative (c) are polyalkylene glycols (e.g., polyethylene glycol, polypropylene glycol, polytetramethylene glycol, polyneopentyl glycol, polyethylene glycol polypropylene glycol, polyethylene glycol polytetramethylene glycol), both ends of which are esterified with an appropriate acid (e.g., acetic acid, propionic acid, butyric acid, valerianic acid, caproic acid, caprylic acid, lauric acid, palmitic acid, stearic acid, benzoic acid); and alkyl ethers (e.g., methyl ether, ethyl ether, butyl ether, lauryl ether, stearyl ether) of the above polyalkylene glycols.

Preferably, the polyalkylene glycol derivative (c) has an average molecular weight of not higher than 5000, more preferably from about 200 to 3000, and most preferably from about 300 to 1500. Much higher molecular weights are not preferred because the compatibility of the components in the resin composition is decreased, so that it brings loss of an accelerated effect on the crystallization of the resin components. On the other hand, lower molecular weights are not preferred because gas evolution is caused at the time of molding.

The amount of the polyalkylene glycol derivative (c) having at least one end group of carboxylate and alkyl ether is 0.1 to 10 parts by weight, preferably 1 to 6 parts by weight, per 100 parts by the total weight of the polyester resins (a) and (b). Amounts less than 0.1 parts by weight of the derivative (c) are not preferred because only a slight effect on the low-temperature moldability of the resin composition is obtained and no improvement is made in the surface glossiness and dimensional accuracy of the resulting molded articles. On the other hand, amounts more than 10 parts by weight of the derivative (c) are not preferred because the physical properties of the resin composition are deteriorated.

The polyester resin composition of the present invention may contain the inorganic reinforcing agent (d), if necessary or required. The addition of such an inorganic reinforcing agent (d) is intended to increase the thermal deflection temperature, dimensional accuracy, strength, and stiffness of the resulting molded articles. Preferred examples of the inorganic reinforcing agent (d) are powdered reinforcing agents such as talc, wollastonite, montmorillonite, mica, and kaoline; and fibrous reinforcing agents such as glass fibers, carbon fibers, and whiskers. Among these, talc is suitable for the production of lamp reflectors and heating appliance parts.

The amount of the reinforcing agent (d), although it depends upon the use of the resulting molded articles, is not more than 120 parts by weight per 100 parts by the total weight of the polyester resins (a) and (b), with the proviso that the reinforcing agent (d) include not more than 120 parts by weight of fibrous reinforcing agents and not more than 100 parts by weight of powdered reinforcing agents, per 100 parts by the total weight of the polyester resins (a) and (b). Amounts more than 120 parts by weight are not preferred because the flowability of the resin composition is decreased at the time of molding and the surface glossiness of the resulting molded articles is deteriorated.

In particular, when the polyester resin composition of the present invention is used for the production of lamp reflectors, it is preferred that the composition contains 10 to 40 parts by weight of talc, per 100 parts by weight of the total weight of the polyester resins (a) and (b). Also, in case of heating appliance parts, the polyester resin composition of the present invention may preferably contain 0.5 to 20 parts by weight of talc, per 100 parts by-weight of the total weight of the polyester resins (a) and (b).

The polyester resin composition of the present invention may further contain various additives, depending upon the purpose and use thereof, such as stabilizers (e.g., antioxidants and ultraviolet light absorbers), plasticizers, lubricants, flame-retardants, antistatic agents, colorants, parting agents, and powdered metal. The addition of antioxidants is particularly preferred.

The polyester resin composition of the present invention can be produced by any conventional process. For example, a premix of the components is kneaded in the molten state by means of an extruder or kneader. In another process, a mixture of several components is kneaded in an extruder or kneader, and formed into pellets which are then kneaded in the molten state together with the remaining components.

The polyester resin composition of the present invention can be molded into various articles with excellent dimensional accuracy against heat aging and excellent mechanical properties by any conventional process under the usual molding conditions for crystalline thermoplastic resins. Therefore, the polyester resin composition of the present invention can be used not only for the production of various molded parts, sheet materials such as films and plates, fibrous materials, tubular materials, and various vessels, but also used as covering agents, coating agents, bonding agents, and modifying agents for other resin compositions. Examples of the molded parts are various parts which may be exposed to heat, such as frames of microwave ovens and electromagnetic cooking apparatus, handles of rice cookers, display panels, frames and knobs of hot plates, warm-air outlets of fan-forced heaters, handles of electric irons, heat insulating plates, warm-air outlets of electric dryers, lamp reflectors, lamp holders, motor cases, gear cases, coil bobbins, relay bases, sensor cases, connectors, and circuit breaker covers. Particularly preferred are various external parts of heating appliances, such as frames of microwave ovens and electromagnetic cooking apparatus, warm-air outlets of fan-forced heaters, and handles of electric irons.

PREFERRED EMBODIMENTS OF THE INVENTION

The following examples further illustrates the present invention in detail but are not to be construed to limit the scope thereof. Unless otherwise indicated, parts and % are by weight. The characteristics of test pieces in the examples were evaluated by the following test methods:

(1) Surface glossiness

Flat plates prepared at a mold temperature of 70° C. are used as test pieces, and the surface glossiness of the test pieces is determined by the 60° incidence method according to the procedure as defined in ASTM D-2457.

(2) Dimensional stability

Flat plates (100 mm×100 mm×2 mm in size) are prepared at a mold temperature of 70° C by injection molding, and these test pieces are annealed at 150° C. for 3 hours. Dimensional changes caused by annealing are obtained both in the machine direction and in the cross direction to determine the degree of post-shrinkage.

Examples 1–10 and Comparative Examples 1–7

Various polyester resin compositions were prepared by premixing polybutylene terephthalate resin (PBT), polyethylene terephthalate resin (PET), glycol dibenzoate (PEGDBE; molecular weight of PEG, 1000), polyethylene glycol dimethyl ether (PEGDME; molecular weight of PEG, 1000), talc (Micronwhite #5000; Hayashi Chemicals Co., Ltd.), wollastonite (VM8; Hayashi Chemicals Co., Ltd.), and glass fibers (cut in a length of 3 mm; Asahi Fiber Glass Co., Ltd.) at the respective proportions shown in Tables 1 and 2.

Each of the compositions was put in the hopper of twin-screw extruder PCM30 and formed into compound chips by kneading in the molten state at a cylinder temperature of 270° to 280° C. The compound chips were dried at 130° C. for 4 hours and molded at a mold temperature of 70° C. by means of injection molding machine FS75 (Nissei Resin Industry Co., Ltd.) to give a molded article as a test piece. The test pieces obtained from the above compositions were subjected to the evaluation of physical properties. The results are shown in Tables 1 and 2.

TABLE 1

| Example No. | 1 | 2 | 3 | 4 | 5 | 6 | 7 | 8 | 9 | 10 |
|---|---|---|---|---|---|---|---|---|---|---|
| Components |  |  |  |  |  |  |  |  |  |  |
| (a) PBT | 65 | 55 | 65 | 65 | 65 | 65 | 65 | 65 | 65 | 65 |
| (b) PET | 35 | 45 | 35 | 35 | 35 | 35 | 35 | 35 | 35 | 35 |
| (c) PEGDBE | 3 | 3 | — | 1 | 6 | 3 | 3 | 3 | 3 | — |
| PEGDME | — | — | 3 | — | — | — | — | — | — | 3 |
| (d) Talc | 3 | 3 | — | 3 | 3 | — | 30 | 3 | 3 | 3 |
| Wollastonite | — | — | — | — | — | — | — | 30 | — | 30 |
| Glass fibers | — | — | — | — | — | — | — | — | 30 | — |
| Physical properties |  |  |  |  |  |  |  |  |  |  |
| Glossiness (%) | 85 | 85 | 84 | 84 | 85 | 83 | 80 | 83 | 76 | 83 |
| Degree of post-shrinkage (%) |  |  |  |  |  |  |  |  |  |  |
| Machine direction | 0.2 | 0.2 | 0.2 | 0.3 | 0.1 | 0.2 | 0.1 | 0.1 | 0.1 | 0.1 |

TABLE 1-continued

| Example No. | 1 | 2 | 3 | 4 | 5 | 6 | 7 | 8 | 9 | 10 |
|---|---|---|---|---|---|---|---|---|---|---|
| Cross direction | 0.2 | 0.3 | 0.3 | 0.4 | 0.2 | 0.2 | 0.1 | 0.2 | 0.3 | 0.2 |

TABLE 2

| Comparative Example No. | 1 | 2 | 3 | 4 | 5 | 6 | 7 |
|---|---|---|---|---|---|---|---|
| Components |  |  |  |  |  |  |  |
| (a) PBT | — | — | 65 | 55 | 35 | 35 | 20 |
| (b) PET | 100 | 100 | 35 | 45 | 65 | 65 | 80 |
| (c) PEGDBE | — | 3 | — | — | — | 3 | 3 |
| PEGDME | — | — | — | — | — | — | — |
| (d) Talc | 3 | 3 | 3 | 3 | 3 | 3 | 3 |
| Wollastonite | — | — | — | — | — | — | — |
| Glass fibers |  |  |  |  |  |  |  |
| Physical properties |  |  |  |  |  |  |  |
| Glossiness (%) | 20 | 25 | 43 | 38 | 30 | 45 | 27 |
| Degree of post-shrinkage (%) |  |  |  |  |  |  |  |
| Machine direction | 1.2 | 0.7 | 0.5 | 0.7 | 0.8 | 0.4 | 0.5 |
| Cross direction | 1.3 | 0.8 | 0.6 | 0.7 | 0.9 | 0.4 | 0.5 |

As can be seen from Tables 1 and 2, the test pieces prepared from the polyester resin compositions of the present invention in Examples 1–10 had higher glossiness and lower degree of post-shrinkage (i.e., higher dimensional stability), as compared with the test pieces prepared in Comparative Examples 1–7.

Accordingly, the polyester resin composition of the present invention can find applications, even in the field of external parts of large heating appliances where the application of conventional polyester resins is difficult because of their low resistance to thermal discoloration.

What is claimed is:

1. A polyester resin composition comprising:
   (a) 55 to 70 parts by weight of a polyester resin composed mainly of a repeating unit of butylene terephthalate;
   (b) 30 to 45 parts by weight of a polyester resin composed mainly of a repeating unit of ethylene terephthalate; and
   (c) 0.1 to 10 parts by weight of a polyalkylene glycol derivative having at least one end group of carboxylate and alkyl ether, per 100 parts by the total weight of the polyester resins (a) and (b).

2. A polyester resin composition according to claim 1, further comprising:
   (d) not more than 120 parts by weight of an inorganic reinforcing agent, per 100 parts by the total weight of the polyester resins (a) and (b).

3. A polyester resin composition according to claim 1, wherein the polyester resin (a) has an intrinsic viscosity of not less than 0.6 as determined in a phenol/tetrachloroethane mixture (6/4 in weight ratio) at 30° C.

4. A polyester resin composition according to claim 1, wherein the polyester resin (b) has an intrinsic viscosity of not less than 0.5 as determined in a phenol/tetrachloroethane mixture (6/4 in weight ratio) at 30° C.

5. A polyester resin composition according to claim 1, wherein the polyalkylene glycol derivative (c) has an average molecular weight of not higher than 5000.

6. A lamp reflector made of a polyester resin composition comprising:
   (a) 55 to 70 parts by weight of a polyester resin composed mainly of a repeating unit of butylene terephthalate;

(b) 30 to 45 parts by weight of a polyester resin composed mainly of a repeating unit of ethylene terephthalate;

(c) 0.1 to 10 parts by weight of a polyalkylene glycol derivative having at least one end group of carboxylate and alkyl ether, per 100 parts by the total weight of the polyester resins (a) and (b); and (d) 10 to 40 parts by weight of talc, per 100 parts by the total weight of the polyester resins (a) and (b).

7. Heating appliance parts made of a polyester resin composition comprising:

(a) 55 to 70 parts by weight of a polyester resin composed mainly of a repeating unit of butylene terephthalate;

(b) 30 to 45 parts by weight of a polyester resin composed mainly of a repeating unit of ethylene terephthalate;

(c) 0.1 to 10 parts by weight of a polyalkylene glycol derivative having at least one end group of carboxylate and alkyl ether, per 100 parts by the total weight of the polyester resins (a) and (b); and (d) 0.5 to 20 parts by weight of talc, per 100 parts by the total weight of the polyester resins (a) and (b).

* * * * *